(12) United States Patent
Berkey et al.

(10) Patent No.: US 6,214,215 B1
(45) Date of Patent: Apr. 10, 2001

(54) RESILIENT OIL FILTER SEAL WITH PRESSURE RELIEF VALVES

(75) Inventors: Richard J. Berkey, Toledo; Allen B. Wright, Grand Rapids, both of OH (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/271,137

(22) Filed: Mar. 17, 1999

(51) Int. Cl.$^7$ .................................................. B01D 27/10
(52) U.S. Cl. .................. 210/130; 210/443; 210/DIG. 17
(58) Field of Search ..................................... 210/130, 440, 210/443–446, 450, 451, DIG. 17

(56) References Cited

U.S. PATENT DOCUMENTS

| | | |
|---|---|---|
| 3,785,491 | 1/1974 | Dudinec et al. . |
| 4,127,484 | 11/1978 | Walulik et al. . |
| 4,747,378 | 5/1988 | Cantoni . |
| 5,271,429 | 12/1993 | Bauer et al. . |
| 5,284,579 | 2/1994 | Covington . |
| 5,405,527 | 4/1995 | Covington . |
| 5,584,987 | 12/1996 | Mules . |
| 5,690,816 | 11/1997 | Covington . |
| 6,027,640 | * 2/2000 | Covington et al. . |

* cited by examiner

Primary Examiner—W. L. Walker
Assistant Examiner—David Sorkin

(57) ABSTRACT

A flexibly resilient sealing member, incorporating integral pressure relief valves, for use in an oil filter assembly, includes a substantially annular body formed from a flexibly resilient material. The annular body has a central bore formed therein for surrounding an oil filter outlet. The annular body also has an upper surface with a plurality of normally closed slits formed therein, a shoulder portion around its top outer edge for sealing placement inside a cylindrical filter element, and a flow channel formed therethrough for each of the normally closed slits, each of the flow channels extending downwardly from one of the normally closed slits and terminating in an open inlet below the shoulder portion and outside of the central bore. The sealing member according to the present invention may further include an integral pedestal ring attached to the lower surface of the annular body adjacent the annular bore and extending downwardly therefrom, and a transverse flange attached to the outer surface of the annular body below the shoulder portion, and extending outwardly therefrom to limit entry of the sealing member into a filter element. In this embodiment, preferably, each of the flow channels extends from a bottom surface of the annular body above the pedestal ring, through the annular body; and communicates with one of the normally closed slits in the top surface of the annular body. The present invention also encompasses an oil filter assembly incorporating the sealing member thereof.

7 Claims, 4 Drawing Sheets

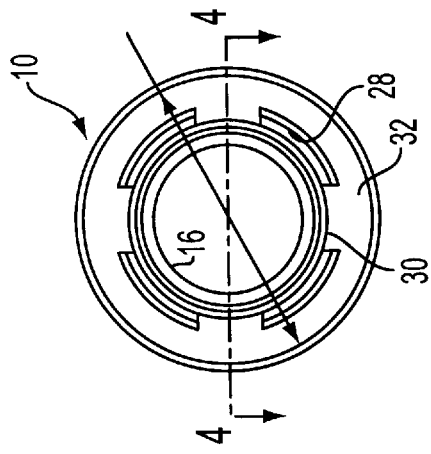
FIG. 3
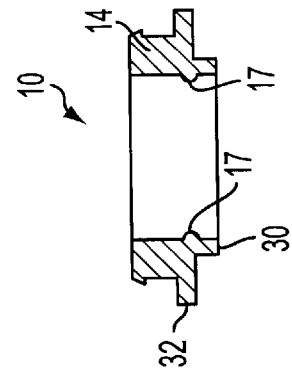
FIG. 4
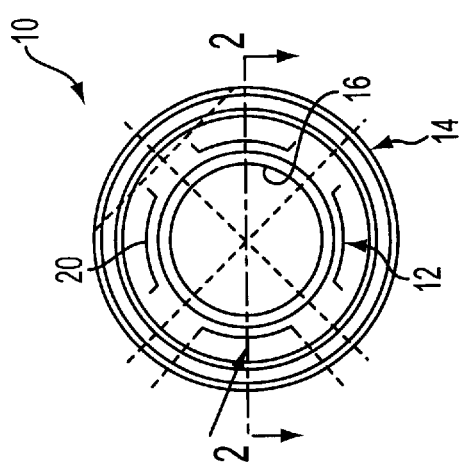
FIG. 1
FIG. 2

RESILIENT OIL FILTER SEAL WITH PRESSURE RELIEF VALVES

BACKGROUND OF THE INVENTION

1. Field of the invention

The present invention relates to a flexibly resilient sealing member for placement inside an oil filter assembly, and to an oil filter assembly incorporating same. More particularly, the present invention relates to a sealing member having integral pressure relief valves formed therein, avoiding the need for supplemental pressure relief valves in a filter assembly, and to an oil filter assembly which incorporates the novel sealing member.

2. Description of the Background Art

Oil filters of many varieties are known. Some of these known oil filters incorporate flexibly resilient pressure relief valve members. Pressure relief valves are included in substantially all oil filter assemblies, to provide circulating engine oil an alternative route through an oil filter when a filter element is restricted due, for example, to dirt accumulation in the filter, or to high oil viscosity at a low operating temperature, such as on a cold start in a winter climate.

Some examples of known designs for oil filter assemblies can be found in U.S. Pat. No. 3,785,491 (Dudinec et al.), U.S. Pat. No. 4,127,484 (Walulik et al.), U.S. Pat. No. 4,747,378 (Cantoni), U.S. Pat. No. 5,271,429 (Bauer et al.), U.S. Pat. No. 5,284,579 and U.S. Pat. No. 5,405,527 (Covington), U.S. Pat. No. 5,584,987 (Mules) and U.S. Pat. No. 5,690,816 (Covington).

Although many designs for oil filter assemblies are known, a need still exists in the art for a relatively simple, straightforward and inexpensive sealing member for use in an oil filter assembly, which will provide an alternative route for oil to follow, to allow the oil to continue circulating through a filter assembly when restriction through the filter element exceeds a certain value, yet which will avoid the necessity of a conventional oil pressure relief valve having a mechanical spring therein. Preferably, such a sealing member would be economical to produce, and would lend itself to high-volume manufacturing operations.

SUMMARY OF THE INVENTION

In a first preferred embodiment, the present invention provides a flexibly resilient sealing member, incorporating integral pressure relief valves therein, for use in an oil filter assembly.

A sealing member in accordance with the present invention, generally, includes a substantially annular body formed from a flexibly resilient material. The annular body has a cylindrical central bore, formed coaxially therethrough, for surrounding an oil filter outlet. The annular body also has an upper surface with a plurality of normally closed slits formed therein, and a shoulder portion formed around its top outer edge for sealing placement inside a hollow cylindrical filter element. The annular body further has a flow channel formed therethrough for each of the normally closed slits. Each of the flow channels extends downwardly from one of the normally closed slits, passes through the annular body, and terminates in an open inlet below the shoulder portion and outside of the central bore.

In a particularly preferred embodiment, the sealing member according to the present invention may also include an integral pedestal ring attached to the lower surface of the annular body, adjacent the annular bore, and extending downwardly therefrom. In this preferred embodiment, the sealing member further includes a transverse flange attached to the outer surface of the annular body below the shoulder portion, and extending outwardly therefrom, to act as a stop means for limiting entry of the sealing member into a filter element. In this embodiment, preferably, each of the flow channels extends from below the normally closed slit, down through the annular body, and terminates in an open inlet located below the transverse flange and radially outside of the pedestal ring.

The present invention also encompasses an oil filter assembly incorporating the sealing member hereof. An oil filter assembly in accordance with the present invention includes a generally cylindrical sealed housing having a floor with a central coaxial outlet formed therethrough, the floor further having a series of inlet holes formed therein arranged in a circular pattern surrounding the outlet. A porous cylindrical filter element is provided in the housing, the filter element having a hollow bore formed centrally therein. A seal is disposed at the top end of said filter element to prevent oil entering the filter element through the top end of the hollow bore. The oil filter assembly also includes the sealing member with the integrally formed pressure relief valves. The sealing member is disposed surrounding the central outlet of the housing, and below the oil filter element, with the top section of the sealing member fitting sealingly inside the hollow bore thereof.

Accordingly, it is an object of the present invention to provide a flexibly resilient sealing member, having integrally formed pressure relief valves, and which is usable as one component of an oil filter assembly.

It is a further object of the present invention to provide an oil filter assembly which incorporates the sealing member hereof.

It is yet a further object of the present invention to provide a method of bypassing a filter element in an oil filter when restriction of the oil filter element thereof exceeds a threshold limit.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 1 is a top plan view of a flexibly resilient sealing member in accordance with a first preferred embodiment of the present invention;

FIG. 2 is a cross-sectional view of the sealing member of FIG. 1, taken along the line 2—2 and partially cut away;

FIG. 3 is a bottom plan view of the sealing member of FIGS. 1–2;

FIG. 4 is a cross-sectional view of the sealing member of FIG. 3, taken along the line 4—4;

DETAILED DESCRIPTION OF THE PRESENTLY PREFERRED EMBODIMENTS

Figure 5:
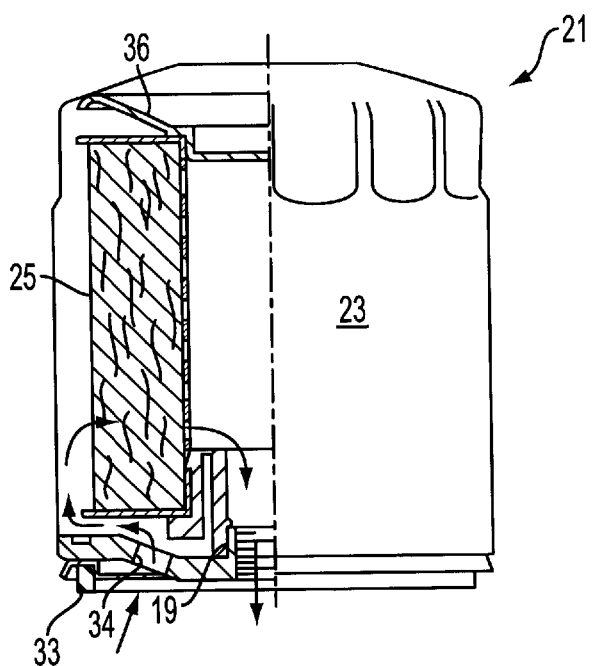
FIG. 5 is a side plan view, partially in cross-section, of an oil filter assembly incorporating the sealing member of FIGS. 1–4 therein, showing normal oil flow therethrough.

Referring now to FIGS. 1–4 of the drawings, a flexibly resilient sealing member in accordance with a first preferred embodiment of the present invention is shown generally at 10. The sealing member 10 is preferably formed of an elastomeric material which is oil-resistant, i.e. which can tolerate being constantly bathed with high-temperature oil without deteriorating or appreciably swelling, such as a nitrile rubber-based material or an oil-tolerant thermoplastic.

The sealing member 10 according to the invention has a plurality of integral pressure relief valves 12 (FIG. 2) formed therein. The specific structure of the pressure relief valves 12 will be further detailed hereinbelow.

As used herein, relative terms such as "upper", "lower", etc. refer to the orientation and arrangement of the parts described herein as shown in FIGS. 2 and 4–6 of the drawings. It will be understood that the sealing member and/or the oil filter assembly according to the present invention could be inverted, turned sideways, or placed in orientations other than those depicted in the drawings, and that the relative descriptions of the component parts and surfaces might then not apply. Such terms are used for purposes of illustration, and are not intended to be limiting.

The sealing member 10 includes a substantially annular body 14 having a central bore 16 formed coaxially therethrough. The coaxial bore 16 may optionally include a sealing rib 17 therein, as shown, to seal against a cylindrical outlet 19 of an oil filter assembly 21 (FIG. 5), which may be received therein, as shown.

The annular body 14 includes an upper surface 18 having a plurality of normally closed slits 20 formed therein, each such closed slit making up part of a pressure relief valve 12. The material of the sealing member 10 is made to be very thin in the area below the slits 20, and the slits may be shaped so as to define displacable gates 22 in the top of the annular body 14. The annular body also includes a shoulder portion 24 formed around its top outer edge, for sealing placement inside a cylindrical filter element 25. Optionally, the shoulder portion 24 may include an outwardly extending ridge 26 to assist in forming a seal in a filter element 25.

The annular body 14 also has a flow channel 27 formed therethrough for each of the normally closed slits 12. Each of the flow channels 27 extends downwardly from one of the normally closed slits 12 so that there is fluid communication between the slit 12 and an open inlet 28. In this first embodiment, the flow channel 27 terminates in an open inlet 28 below the shoulder portion 24 and outside of the central bore 16.

The sealing member 10 according to the first embodiment of the present invention may also include an integral pedestal ring 30 attached to the lower surface of the annular body 14, adjacent the annular bore 16, and extending downwardly therefrom to space the inlet 28 up and away from a floor 31 of a filter assembly 21. The sealing member 10 may further include a transverse flange 32 attached to the outer surface of the annular body 14 below the shoulder portion 24, and extending outwardly therefrom to limit entry of the sealing member 10 into a filter element 25, and to help form a seal therewith. The transverse flange 32 provides a platform for supporting placement below a lower surface of a filter element 25. The platform provided by the transverse flange 32 is spaced above the floor 31 of an oil filter assembly 21 (FIG. 5). In this embodiment, preferably, each of the flow channels 27 extends from below the normally closed slit 12, down through the annular body 14, and terminates in an open inlet 28 located below the transverse flange 32 and outside of the pedestal ring 30.

As may be seen from the cross-sectional view of FIG. 4, in this first embodiment of the invention, the sealing member 10 is not hollow at all areas thereof. Thus it may be further seen, by the phantom lines in FIG. 3, that the flow channels 27 extend only in defined areas below the normally closed slits 12, and do not form a continuous ring within the annular body 14. This arrangement provides added strength and crush-resistance to the sealing member 10 than would otherwise be the case, if the flow channels formed a continuous ring about the sealing member 10.

Figure 6:
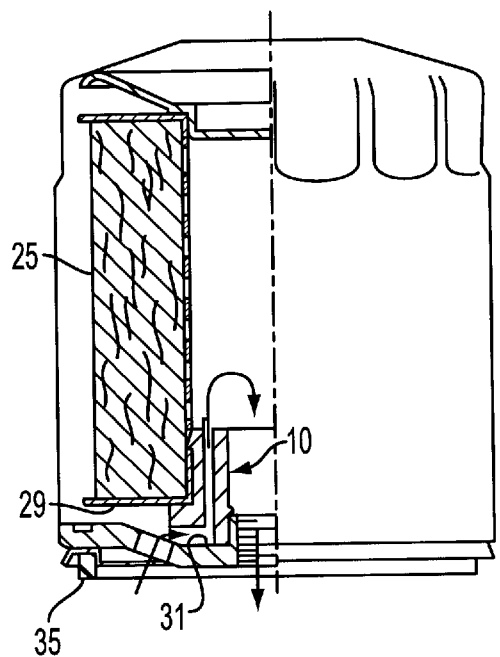
FIG. 6 is a side plan view, partially in cross-section, of the oil filter assembly of FIG. 5, showing oil flow therethrough when flow through the filter element is obstructed, and the pressure relief bypass feature is activated.
Figure 7:
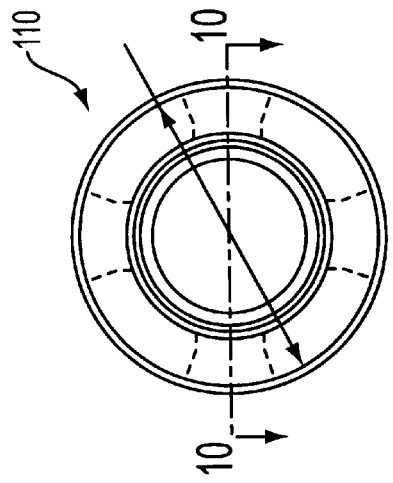
FIG. 7 is a top plan view of a flexibly resilient sealing member in accordance with a second preferred embodiment of the present invention.
Figure 8:
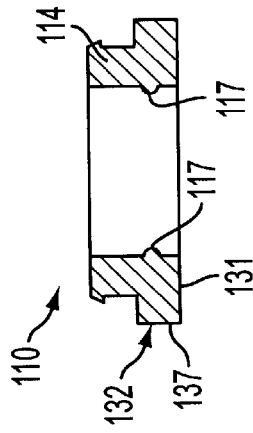
FIG. 8 is a cross-sectional view of the sealing member of FIG. 7, taken along the line 8—8 and partially cut away.
Figure 9:
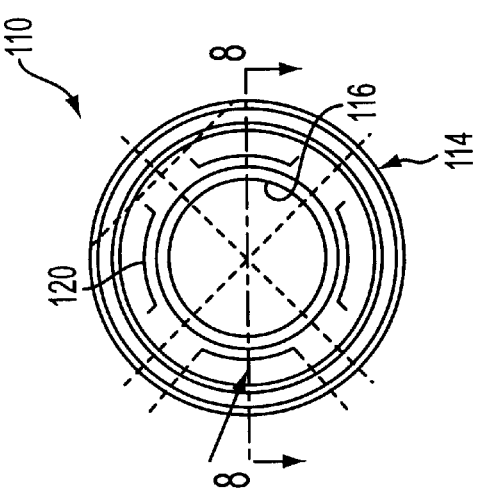
FIG. 9 is a bottom plan view of the sealing member of FIGS. 7–8.
Figure 10:
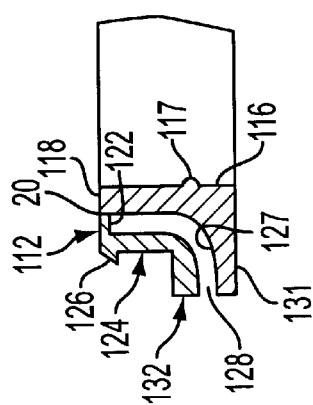
FIG. 10 is a cross-sectional view of the sealing member of FIG. 9, taken along the line 10—10.

Refering now to FIGS. 5–6, the present invention also encompasses an oil filter assembly 21 incorporating the sealing member 10 hereof. The oil filter asssembly 21 depicted in FIGS. 5–6 is a spin-on type of filter, having a generally cylindrical sealed housing 23 with a central coaxial outlet 19 which is internally threaded to fit on an engine block (not shown). A series of inlet holes 34 are formed in the floor 31 of the housing 23, and are arranged in a circular pattern surrounding the outlet 19. A circular oil filter gasket 33 is provided in conventional fashion surrounding the inlet holes 34, and a circular groove 35 is provided in the base of the housing to retentively receive the gasket 33. The housing 23 contains a porous cylindrical filter element 25 which has an oil seal 36 disposed at the top end thereof, to force oil to travel through the filter element 25.

As shown by the flow arrows in FIG. 5, under normal conditions, oil progresses from the inlet holes 34, beneath the lower end 29 of the oil filter element 25 (the lower end 29 being sealed so as to be non-porous), and around to the outside surface of the filter element. The oil then passes through the filter element 25, so long as the filter element is not excessively obstructed by dirt, and under conditions where the oil viscosity is sufficiently low to permit it to pass through the filter element.

As shown in FIG. 6, the sealing member 10 according to the present invention provides an alternative route for oil to follow when restriction across the filter element 25 exceeds a predetermined level. This high restriction occurs either when the engine is cold started in a winter climate, causing the oil to have a high initial viscosity, or when the filter element 25 becomes clogged with excessive amounts of dirt or other contaminants. When restriction across the filter element reaches a predetermined level, oil pressure inside the housing 23 outside of the filter element 25 increases to a level at which the gates 22 are forced open, and the oil then flows through the flow channels 27 and the gates 22, bypassing the filter element 25, as shown by the flow arrows in FIG. 6.

Referring now to FIGS. 7–10, an alternative embodiment of a sealing member according to the present invention is shown generally at 110, which is formed from the same material referred to above in connection with the first embodiment.

The sealing member 110 according to the second embodiment of the invention has a plurality of integral pressure relief valves 112 (FIG. 8) formed therein. The sealing member 110 includes a substantially annular body 114 having a central bore 116 formed coaxially therethrough, which may optionally include a sealing rib 117 therein, as shown, to seal against a cylindrical outlet 19 of an oil filter assembly 21 (FIG. 5), which may be received in the central bore 116. The annular body 114 includes an upper surface 118 having a plurality of normally closed slits 120 formed therein. The material of the sealing member 110 is made to be very thin in the area below the slits 120, and the slits may be formed so as to define displacable gates 122 in the top of the annular body 114. The annular body 114, in this second embodiment, also includes a shoulder portion 124 formed around its top outer edge, for sealing placement inside a cylindrical filter element 25. Optionally, the shoulder portion 124 may include an outwardly extending ridge 126 to assist in forming a seal in a filter element 25.

The annular body 114 also has a flow channel 127 formed therethrough for each of the normally closed slits 120. Each of the flow channels 127 extends downwardly from one of the normally closed slits 112 so that there is fluid communication between the slit 112 and an open inlet 128. In this second embodiment, the flow channel 127 terminates in an open inlet 128 below the shoulder portion 124 and outside of the central bore 116. However, in this embodiment, unlike the first embodiment, the flow channel 127 curves outwardly as it progresses through the sealing member 110 from the normally closed slit 120. This allows the bottom surface 131 of the sealing member 110 to be made flat. The sealing member 110 further includes an enlarged step portion 132, 137 extending radially outwardly from the annular body 114, and in this embodiment, the inlet 128 is formed in an outer side edge of the step portion 132,137. As seen best in FIG. 10, the sealing element 110 in this embodiment also includes solid portions interspaced with the flow channels 127.

Figure 11:
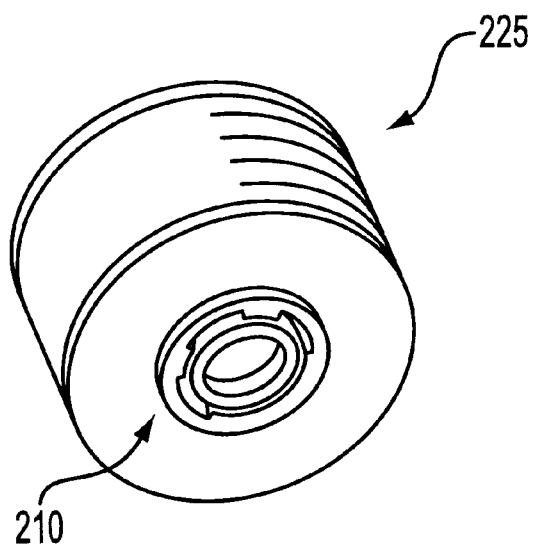
FIG. 11 is a perspective view of an oil filter element for a vehicle having a replaceable element, and showing the sealing member of FIGS. 1–4 emplaced therein.
Figure 12:
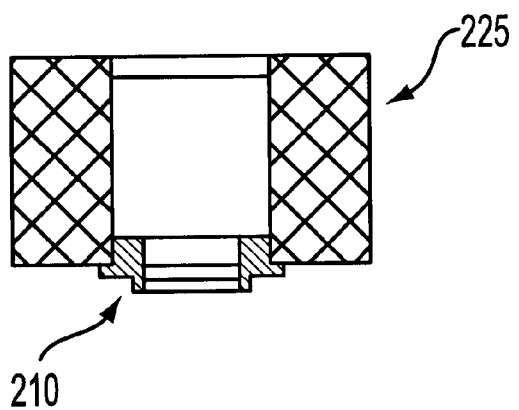
FIG. 12 is a cross-sectional view of the filter element and sealing member of FIG. 11, with the sealing member shown simplified for purposes of illustration.

Referring now to FIGS. 11–12, a hollow cylindrical oil filter element 225 for use with an engine having a removable housing in which the filter element 225 can be replaced without changing the housing. A sealing member 210 according to the general teachings of the invention, and which is substantially identical to the sealing member 10 of the first embodiment as described herein, may also be used with this type of oil filter.

Although the present invention has been described herein with respect to presently preferred embodiments thereof, the foregoing description is intended to be illustrative, and not restrictive. Those skilled in the art will realize that many modifications of the preferred embodiments could be made which would be operable. All such modifications which are within the scope of the claims are intended to be within the scope and spirit of the present invention.

What is claimed is:

1. An oil filter assembly, comprising:
   a substantially cylindrical sealed housing having a floor with a central coaxial outlet formed therethrough, said floor further having a series of inlet holes formed therein arranged in a circular pattern surrounding said outlet;
   a porous cylindrical filter element disposed in said housing and having a hollow bore formed centrally therein;
   a seal disposed in said housing at an upper end of said filter element; and
   a flexibly resilient sealing member interposed axially between said floor and said filter element and radially between said outlet and said series of inlet holes, said sealing member comprising:
      a substantially annular body formed from a flexibly resilient material, said body having a central bore formed therein for surrounding said outlet, said annular body having an upper surface, a lower surface, an inner surface, and an outer surface;
      spacer means for spacing said filter element away from said floor;
      a plurality of normally closed slits extending through the flexibly resilient material of said annular body, said slits obstructing the flow of oil therethrough when fluid pressure of said oil is below a threshold value, and allowing the passage of oil therethrough when fluid pressure of said oil is at or above said threshold value;
      said annular body further having a plurality of flow channels formed therethrough for delivering oil under pressure from said inlet holes to said plurality of normally closed slits.

2. The oil filter assembly of claim 1 wherein said sealing member comprises an integral pedestal ring attached to the lower surface of said annular body adjacent to the inner surface of the annular body and extending downwardly therefrom; and wherein said spacer means comprises a transverse flange attached to said outer surface of said annular body.

3. The oil filter assembly of claim 1 wherein said slits are located at the upper surface of said annular body.

4. The oil filter assembly of claim 3 wherein each of said flow channels is formed between an opening at the outer surface of said annular body and a slit at the upper surface of said annular body.

5. The oil filter assembly of claim 3 wherein each of said flow channels is formed between an opening at the lower surface of said annular body and a slit at the upper surface of said annular body.

6. The oil filter assembly of claim 1 wherein said annular body has a shoulder portion adjacent to the upper and outer surfaces of the annular body.

7. An oil filter assembly comprising:
   a substantially cylindrical sealed housing having a floor with a central coaxial outlet formed therethrough, said floor further having a series of inlet holes formed therein arranged in a circular pattern surrounding said outlet;
   a porous cylindrical filter element disposed in said housing and having a hollow bore formed centrally therein;
   a seal disposed in said housing at an upper end of said filter element; and
   a flexibly resilient sealing member interposed axially between said floor and said filter element and radially between said outlet and said series of inlet holes, said sealing member comprising:
      a substantially annular body formed from a flexibly resilient material, said body having a central bore formed therein for surrounding said outlet, said annular body having an upper surface, a lower surface, an inner surface, and an outer surface;
      spacer means for spacing said filter element away from said floor;
      a plurality of normally closed slits extending through the flexibly resilient material at the upper surface of said annular body, said slits obstructing the flow of oil therethrough when fluid pressure of said oil is below a threshold value, and allowing the passage of oil therethrough when fluid pressure of said oil is at or above said threshold value;

said annular body further having a plurality of flow channels formed therethrough between the upper surface of the annular body and the outer or lower surface of the annular body for delivering oil under pressure from said inlet holes to said plurality of normally closed valve means.

* * * * *